United States Patent [19]

Vincent et al.

[11] Patent Number: 4,830,896

[45] Date of Patent: May 16, 1989

[54] METHOD OF STABILIZING MAGNETIC METAL PIGMENT

[75] Inventors: Harold L. Vincent; Judith M. Sylvester, both of Midland, Mich.

[73] Assignee: Dow Corning Corporation, Midland, Mich.

[21] Appl. No.: 214,246

[22] Filed: Jul. 1, 1988

Related U.S. Application Data

[62] Division of Ser. No. 148,304, Jan. 25, 1988, Pat. No. 4,780,148.

[51] Int. Cl.[4] .............................................. B05D 3/14

[52] U.S. Cl. .................................... 427/48; 106/403; 427/128; 427/130; 427/132; 428/900

[58] Field of Search ................. 427/48, 128, 130, 132; 428/900; 106/308 Q Primary Examiner—Bernard Pianalto
Attorney, Agent, or Firm—Alexander Weitz

[57] ABSTRACT

This invention relates to a stabilized ferromagnetic metal pigment which is produced by treating metal particles with a passivating reaction product comprising a silane-modified phosphate. The treated pigment is employed in the preparation of a magnetic recording medium which is resistant to storage at elevated temperature and humidity.

8 Claims, No Drawings

METHOD OF STABILIZING MAGNETIC METAL PIGMENT

This is a divisional of copending application Ser. No. 148,304, filed on Jan. 25, 1988, now U.S. Pat. No. 4,780,148.

BACKGROUND OF THE INVENTION

Ferromagnetic metal particles have found increasing utility in the production of advanced magnetic recording media. These magnetic "pigments" have superior magnetic characteristics, such as coercivity and magnetic remanence, relative to traditional iron oxide particles, which allows their use in high density magnetic media for the recording of video and digital signals. Despite such advantages, however, metal pigments suffer from at least two serious drawbacks: they are hard to disperse in a magnetic medium and they are extremely reactive, even to the point of being pyrophoric. The high reactivity of metal pigments makes their handling and storage quite difficult and had spurred those skilled in the art to develop improved methods for passivating the particles. Thus, for example, a widely practiced method for passivating iron pigment comprises oxidizing its surface in a controlled fashion, thereby imparting a measure of stability to the pigment. Such treatments ar still inadequate since subsequent diffusion of iron atoms leads to a regeneration of a reactive surface upon storage of this stabilized pigment. Moreover, a significant portion of the metallic iron is converted to the oxide by this process, thereby reducing the magnetic properties of the particles and negating some of the advantages of employing metal pigment in the first place. This is particularly true for the case of very small metal particles.

The reactivity of metal pigment, even when partially stabilized by controlled surface oxidation as described above, results in poor storage stability of magnetic recording media made from these particles, particularly under conditions of elevated temperature and humidity. In an effort to further stabilize a metal pigment, Tadokoro et al., in U.S. Pat. No. 4,069,073, disclose a conventional process for the production of a ferromagnetic metal powder comprising reducing a metal salt, wherein the product is further treated with a solution containing phosphate ions. The additional treatment is said to provide metal particles which exhibit humidity resistance.

Various silicone compounds have also found utility in connection with magnetic media based on metallic pigment particles. Thus, for example, in U.S. Pat. No. 4,336,310, Okuyama et al. teach a magnetic recording medium wherein the metal pigment supporting silica on its surface is coated with sequential layers of a hydrolyzed silane and oleic acid. This magnetic medium is said to posses excellent oxidation resistance.

Biermann et al., in U.S. Pat. No. 4,325,739, disclose a pigment of a magnetic metal or alloy coated with at least one composition selected from an ortho-silicic acid ester, a hydrolyzate thereof or a condensation product thereof. The resultant pigment is said to be non-pyrophoric and of high magnetic performance.

In U.S. Pat. No. 4,437,882 to Umemura et al., there is disclosed a nickel-containing iron pigment which is treated with an organic silane compound such as a silicone oil, a silane coupling agent and a silicate. The resulting ferromagnetic powder is said to have excellent oxidative stability and a high saturation magnetization.

Another pigment which is coated with a silane is taught by Matsufuji et al. in U.S. Pat. No. 4,475,946. The metal particles are said to be readily dispersible in a magnetic recording medium and to have excellent stability and corrosion resistance.

The combination of a phosphate ester and silicone compound for use in magnetic media is disclosed by Sylvester et al. in U.S. Pat. No. 4,640,790, assigned to the assignee of the present invention. In this patent, a reaction product of the phosphate ester and an alkali siliconate silylalkylphosphonate is shown to act as an improved dispersant for magnetic particles.

SUMMARY OF THE INVENTION

It has now been found that certain silane-modified phosphate passivating compositions impart stability to magnetic metal particles. This is evidenced by improved retention of remanent magnetic flux (hereinafter designated $B_r$) when magnetic recording media, prepared according to the method of the present invention are stored under adverse temperature and humidity conditions. Retention of $B_r$, which is a measure of magnetic induction after a saturated magnetizing field is reduced to zero, is considered vital since its value is related directly to the signal-to-noise ratio of the recording medium. This invention thus relates to a composition comprising:

(A) from about 2 to 15 parts by weight of a reaction product of
  (I) an organic halide having the formula $$X-R''$$

wherein X is selected from the chlorine or bromine radical and R" is selected from alkyl radicals having 8 to 20 carbon atoms or the group

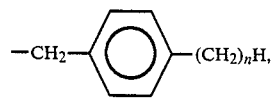

in which n is an integer between 8 and 22, inclusive, and a reactant selected from
  (II) a silylalkyl ester of phosphorus having the formula

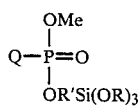

wherein Me denotes the methyl radical, Q is selected from —OMe or an alkyl group having from 1 to 4 carbon atoms, R' is a divalent hydrocarbyl group having 3 to 8 carbon atoms, and R is an alkyl group having 1 to 3 carbon atoms, or a mixture of
  (III) an organic phosphate having the formula

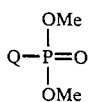

and (IV) an haloalkyl-functional silane having the formula

X—R'Si(OR)₃ wherein the symbols have their previously defined meanings; and (B) 100 parts by weight of a magnetic metal pigment.

This invention also relates to a process for producing a magnetic recording medium comprising:

(i) treating magnetic metal particles with a passivating reaction product to form a treated pigment;

(ii) mixing said treated pigment, a binder for said treated pigment and an inert organic solvent capable of dissolving said binder, to obtain a uniform dispersion thereof;

(iii) coating said dispersion onto a non-magnetic substrate;

(iv) orienting said treated pigment in a magnetic field; and (v) removing said solvent from the coated substrate, said passivating reaction product comprising the above described reaction product (A).

DETAILED DESCRIPTION OF THE INVENTION

The present invention relates to a composition comprising (A) a passivating reaction product and (B) a magnetic metal pigment. Upon addition of a binder and an inert solvent for said binder, the above composition is formulated into a magnetic coating composition which is, in turn, coated onto a non-magnetic substrate and dried to form a magnetic recording medium.

The passivating reaction product (A) of the present invention may be a reaction product of an organic halide having the formula

X—R''  (I)

and a silylalkyl ester of phosphorus having the general formula $$\begin{array}{c} \text{OMe} \\ | \\ \text{Q—P=O} \\ | \\ \text{OR'Si(OR)}_3 \end{array} \quad \text{(II)}$$

In formula (I), X is chlorine or bromine, preferably chlorine; and R'' is selected from alkyl radicals having 8 to 20 carbon atoms or the group

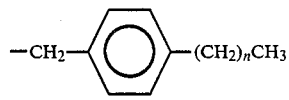

in which n is an integer between 8 and 22, inclusive. It is preferred that R'' is the n-octadecyl radical. In formula (II), Me hereinafter denotes the methyl radical; Q is selected from —OMe or an alkyl group having from 1 to 4 carbon atoms; R' is a divalent hydrocarbyl group having 3 to 8 carbon atoms, preferably trimethylene; and R is an alkyl group having 1 to 3 carbon atoms, preferably the methyl radical. For the purposes of the present invention, the molar ratio of the organic halide (I) to the silylalkyl ester of phosphorus (II) is preferably about 1:1 when Q is alkyl and from about 1:1 to 2:1 when Q is a methoxy group. It is most preferred that this ratio be 1:1 and Q be the methyl radical.

It is preferred, however, that the passivating reaction product (A) is a reaction product of the organic halide (I) and a mixture of an organic phosphate having the structure $$\begin{array}{c} \text{OMe} \\ | \\ \text{Q—P=O} \\ | \\ \text{OMe} \end{array} \quad \text{(III)}$$

and an haloalkyl-functional silane having the formula

X—R'Si(OR)₃  (IV)

wherein the symbols have their previously defined meanings. For the purposes of the present invention, the molar ratio of organic halide (I) to organic phosphate (III) to haloalkyl-functional silane (IV) is preferably about 1:1:1 when Q is alkyl. When Q is a methoxy group, the molar ratio of the reactants is adjusted so as to provide at least one —R'Si(OR)₃ group and at least one —R'' group for the reaction product. It is preferred that this molar ratio be 1:1:1 and Q be the methyl radical.

All of the compounds of formulas (I) through (IV) are well known in the art. For example, the silylalkyl esters of phosphorus may be prepared according to methods described by Plueddemann in U.S. Pat. No. 4,093,641, assigned to the assignee of the present invention and hereby incorporated by reference. In one aspect, this patent describes the reaction between an haloalkyl-functional silane such as (IV) and a phosphrous compound such as (III), wherein amines or phosphines capable of forming onium compounds with the reactants are employed as catalysts and the reaction is carried out at 100° C. to 300° C. The reaction conditions during preparation of the passivating compositions of the present invention by the above two methods are similar to those described by Plueddemann, cited supra, and require the presence of the above mentioned amine or phosphine catalysts. It is preferred that the catalyst employed is benzyldimethylamine.

In one preferred embodiment of this invention, the silylalkyl ester of phosphorus $$\begin{array}{c} \text{OMe} \\ | \\ \text{Me—P=O} \\ | \\ \text{O—CH}_2\text{CH}_2\text{CH}_2\text{—Si(OMe)}_3 \end{array}$$

is reacted with n-octadecylchloride ($C_{18}H_{37}Cl$) in a 1:1 molar ratio in the presence of benzyldimethylamine to form the passivating reaction product (A).

In another preferred embodiment of this invention, the passivating reaction product is a reaction product of

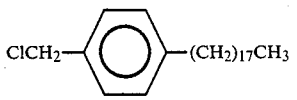

O=P(OMe)₃ and gamma-chloropropyltrimethoxysilane in a mole ratio of about 1.5:1.0:1.5, respectively.

The reaction is again carried out in the presence of benzyldimethylamine.

The magnetic metal pigment (Component B) of this invention is well known in the art. It consists essentially of finely divided metal and metal alloy particles which comprise, in majority, a ferromagnetic metal such as iron, cobalt, nickel or alloys thereof. These metal pigments may further contain from about 0.1 to 10% by weight of one or more elements selected from Cd, Zn, Pb, Ca, Mg, Cr, Al, W, P or B. Additional impurities, such as water, oxides and oxide-hydroxides, may also be contained in component (B). Preferred magnetic metal pigments are selected from acicular alpha-iron particles having a surface area in the range of 40-70 m²/gram.

The compositions of the present invention may be prepared by treating the magnetic metal pigment (B) with the passivating composition (A). This treatment may be carried out by simply stirring a mixture of these two components together with a volatile solvent, or rolling the mixture in a ball mill, at ambient temperature to form a uniform dispersion. After rolling this dispersion for about 16 hours, the treated pigment is filtered, dried and stored in tightly capped containers. Alternatively, treatment may be accomplished by refluxing about 100 parts by weight of the pigment (B) and the required amount of the passivating reaction product (A) in about 400 parts by weight of the volatile solvent. After refluxing for several hours, the cooled dispersion is stirred for about 16 hours and isolated as above. In each of these procedures, the nature of the volatile solvent is not critical provided it does not adversely influence any of the magnetic properties of the final medium. Examples of suitable solvents include toluene, cyclohexanone, methyl ethyl ketone, tetrahydrofuran, methyl isobutyl ketone and butyl acetate.

The amount of passivating reaction product required to treat the pigment particles depends on the specific particles under consideration and may readily be ascertained by those skilled in the art after a few simple experiments. For the purposes of the present invention, from about 2 to 15 parts by weight of the passivating reaction product (A) are used to treat 100 parts by weight of the pigment (i.e., 2-15 parts per hundred, hereinafter designated as pph). In general, however, the minimum amount of the passivating reaction product compatible with desired magnetic properties of the subsequently prepared magnetic medium is employed. Thus, for example, when an acicular iron pigment having a surface area of about 40-70 square meters per gram is used, about 4 to 10 pph of one of the above described preferred passivating reaction products is suitable.

The present invention also relates to a process for producing a stable magnetic recording medium from the above described treated pigment. According to methods well known in the art, a wet magnetic coating composition is prepared by simultaneously, or sequentially, mixing the treated pigment, a binder for the pigment, an inert organic solvent for the binder and, optionally, various adjuvants. A mixer such as a ball mill, two-roll mill, continuous media mill, sand mill, colloid mill or homogenizer may be utilized to thoroughly mix the ingredients till a good dispersion is attained.

The binder of the present invention may be any suitable resin capable of binding the magnetic metal particles to each other as well as to a non-magnetic substrate, described infra. These materials are also well known in the art, examples being polyurethane, poly(vinyl chloride), polyester, poly(vinylidene chloride), epoxy resin, poly(acrylonitrile), polyacrylic esters, polymethacrylic esters, polyamide, poly(vinyl acetal), poly(vinyl butyral), poly(vinyl pyridine), polycarbonate, polysulfone, phenol formaldehyde resin and melamine formaldehyde resin. A preferred binder is polyurethane. Typically, the binder content of the magnetic coating composition is between about 2 and 30 parts on a weight basis per 100 parts of the treated pigment particles.

The inert organic solvent selected should be a good solvent for the binder and may be selected from the solvents described in connection with the pigment treatment procedure, supra. In practice, the binder is preferably added in the form of a solution in one or more of these solvents.

In addition to the treated pigment, binder and inert organic solvent, the magnetic coating compositions of this invention typically contain various adjuvants known in the art to improve the final characteristics of the magnetic recording medium. Suitable adjuvants include dispersants, modifying resins such as vinyl resins, nitrocellulose and high molecular weight epoxy compounds, lubricants, corrosion inhibitors, antistatic agents and polishing agents. Generally, the magnetic coating composition may contain from about 2 to about 10 parts by weight of such adjuvants, based on 100 parts of the treated pigment particles.

A magnetic recording medium is prepared by applying the solvent-containing magnetic coating composition, described above, to a non-magnetic substrate, orienting the magnetic metal particles in a magnetic field, and drying the coating. Suitable non-magnetic substrates include polymers, such as polyethylene terephthalate, polyethylene, polypropylene, cellulose triacetate, polycarbonate and polyimides. Alternatively, the substrate may be a non-magnetic metal, such as aluminum, copper, tin, zinc, magnesium and alloys thereof. The form of the substrate is not critical, films, tapes, sheets, discs and drums being within the scope of this invention. Application of the coating to the substrate may be accomplished by any of the usual methods known in the art, such as blade coating, reverse roll coating, and gravure coating. The removal of solvents, or drying, is preferably carried out at a temperature of about 60° to 85° C. Dry coating thickness obtained can be varied according to the particular application, but generally it is kept between 0.75 and 20 micrometers.

EXAMPLES

The following examples are presented to further illustrate the compositions of this invention, but are not to be construed as limiting the invention, which is delineated in the appended claims. All parts and percentages in the examples are on a weight basis unless indicated to the contrary.

Example 1

A 250 ml three neck flask equipped with a thermometer, stirrer, condenser, cold trap and nitrogen purge was charged with 20.3 grams (0.16 mole) of a phosphate having the structure

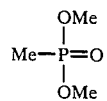

wherein Me denotes the methyl radical, 32.4 grams (0.16 mole) gamma-chloropropyltrimethoxysilane, 47.3 grams (0.16 mole) of n-octadecyl chloride and 0.5 grams of benzyldimethylamine catalyst. The mixture was agitated while being heated over a period of 47 minutes, at which point the temperature was 177° C. After reacting for a total of 4 hours, the contents of the flask were cooled. About 7.4 grams of methyl chloride by-product was collected in the cold trap and 89 grams of product was recovered. The major portion of this material was believed to have the structure

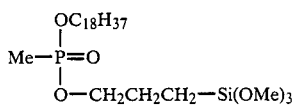

Example 2

A procedure similar to that of Example 1 was followed wherein 22.3 grams (0.159 mole) of a phosphate having the structure

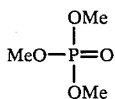

was reacted with 31.6 grams (0.159 mole) gamma-chloropropyltrimethoxysilane and 46.0 grams (0.159 mole) of n-octadecyl chloride in the presence of 0.5 grams of benzyldimethylamine catalyst. The major portion of this product was believed to have the structure

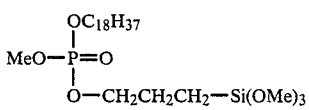

Example 3

A procedure similar to that of Example 1 was followed wherein 15.3 grams (0.109 mole) of a phosphate having the structure

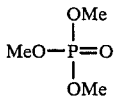

was reacted with 21.6 grams (0.109 mole) gamma-chloropropyltrimethoxysilane and 63.1 grams (0.218 mole) of n-octadecyl chloride in the presence of 0.5 grams of benzyldimethylamine catalyst. The major portion of this product was believed to have the structure

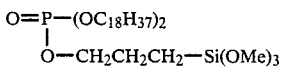

Example 4

A procedure similar to that of Example 1 was followed wherein 13.9 grams (0.0993 mole) of a phosphate having the structure

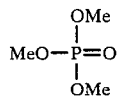

was reacted with 29.6 grams (0.149 mole) gamma-chloropropyltrimethoxysilane and 56.5 grams (0.149 mole) of an organic chloride having the structure

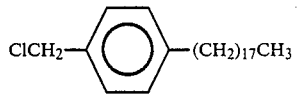

in the presence of 0.5 grams of benzyldimethylamine catalyst. The major portion of this product was believed to have the average structure

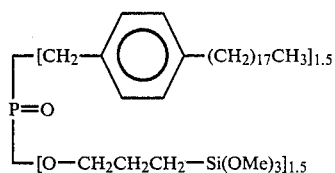

(Comparative) Example 5

A procedure similar to that of Example 1 was followed wherein 136 grams (0.5 mole) of a silylalkyl ester of phosphorus having the structure

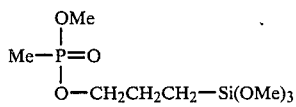

was reacted with 67.5 grams (0.5 mole) of n-heptyl chloride were reacted in the presence of 1.0 gram of benzyldimethylamine catalyst. The major portion of this product was believed to have the structure

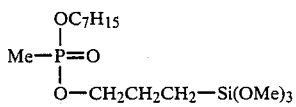

Magnetic Media Preparation

The passivating compositions of Example 1-5 were employed in the preparation of magnetic media as follows.

1. Treatment of Metal Pigment

First, a magnetic metal pigment was treated with the above described passivating compositions. A one quart wide-mouth polyethylene jar was half filled with ¼ inch diameter stainless steel balls. Fifty grams of the pigment (as received), 150 grams of dry toluene and the appropriate amount of the passivating reaction product were added to the jar. After folling this mixture at room temperature for 16 hours, the resulting dispersion was filtered through a No. 40 WHATMAN filter paper and the treated metal pigment dried to constant weight of 40° C.

2. Slush Grind

A 5.5 oz stainless steel container containing approximately 250 grams of stainless steel balls having a diameter of about ⅛ inch was charged with about 15 grams of one of the above treated pigments. There was then added 2.4 grams of a 25% solution of GAFAC RE-610 dispersant in cyclohexanone. GAFAC RE-610 (GAF Corp., Wayne, N.J.) is described as a blend of phosphate mono- and di-esters of the ethylene oxide-adduct type, having a maximum moisture content of 0.5%, a specific gravity of 1.10 to 1.12, an acid number of 62–72 and a pH <2.5 (10% solution at 25° C.).

Next, there was added 6.2 grams of a 10% solution of ESTANE 5701-F1 binder in cyclohexanone. ESTANE 5701-F1 (B. F. Goodrich Company, Cleveland, OH) is described as a polyesterbased polyurethane resin. An additional 41.4 grams of cyclohexanone was then added so as to reduce the total solids content. The container was closed and the contents milled by vibrating the container and its contents on a standard paint shaker for 4 hours at room temperature.

3. Let-Down

An additional 0.52 grams of the GAFAC RE-610 solution and 43.7 grams of the ESTANE 5701-F1 solution were added to the above milled dispersion to provide a final treated pigment content of 70% (based on total solids). An additional mill time of 30 minutes resulted in a magnetic media coating composition.

The above described slush grind and let-down procedures were also used to prepare control formulations wherein the pigment particles were not treated.

4. Tape Production

Each magnetic media coating composition was coated onto 1.42 mil thick video-grade poly(ethylene teraphthalate) film using a draw-down coating bar having a 2 mil gap at a coating speed of approximately one foot per second. Simultaneous to the coating procedure, the still wet magnetic coating was subjected to orientation by a 2,000 Oersted one-way magnet in a direction parallel to the draw axis. The coated film was allowed to dry at room temperature for at least one hour, whereupon two 20 inch-long by ⅜ inch-wide tape sections were cut longitudinally (i.e., along the draw direction) from said film. The tape sections were folded in half (lengthwise) and inserted into a 10 mm diameter glass sample tube for magnetic property evaluation as follows.

An LDJ B/H meter, model number 7500A (LDJ, Troy, MI), was used to determine the remanent flux ($B_r$) at 22° C. using a frequency of 60 Hz and a longitudinally applied field of 4,500 Oe. At least 5 readings were taken for each sample and averaged to obtain the reported results.

5. Aging at Elevated Temperature and Humidity

After initial $B_r$ measurements were obtained on a magnetic tape, it was aged at 60° C. and 93% relative humidity for up to 4 weeks. After a given time period, the tape was withdrawn, and tested, as above, to determine the retention of $B_r$.

The passivating compositions of Examples 1–4 and (Comparative) Example 5 were employed to prepare magnetic media wherein the metal pigment consisted of MAP-1000 (Kento Denka Kogyo Co., Ltd., Tokyo, Japan) and the treatment level was 7 parts per 100 parts of pigment (i.e., 7 pph). MAP-1000 is described as an acicular iron particle having a surface are of 40–70 m²/g, an average particle length of 0.1–0.3 micron and an aspect ratio of 10–15. Remanent flux values after 3 weeks' aging at 60° C. and 93% relative humidity were compared with initial values and are shown in Table 1. Also presented in Table 1 are the respective values for a control formulation wherein the iron pigment was not treated at all.

TABLE 1

Retention of Remanent Flux with MAP-1000 Iron Pigment

| Passivating Composition | $B_r$ (Gauss) Initial | $B_r$ (Gauss) After Aging | Retention of $B_r$ (%) |
|---|---|---|---|
| Example 1 | 2245 | 1748 | 78 |
| Example 2 | 2120 | 1672 | 79 |
| Example 3 | 1662 | 1277 | 79 |
| Example 4 | 1720 | 1344 | 78 |
| (Comparative) Example 5 | 1490 | 1113 | 75 |
| Control (No Treatment) | 2027 | 1531 | 76 |

It can be seen from Table 1 that magnetic media containing the compositions of the present invention provided improved stability with respect to exposure to elevated temperature and humidity versus media wherein the pigment was treated with (Comparative) Example 5 or wherein the pigment was not treated at all (i.e., Control).

The above procedures were followed using the passivating reaction product of Example 4 to treat PFERROMET 1500 pigment so as to obtain a level of 10 parts passivating reaction product per 100 parts of pigment (i.e., 10 pph). PFERROMET 1500 (Pfizer Pigments, Inc., New York, N.Y.) is described as an acicular iron particle having a carbon content of 1%, a maximum moisture content of 1.5% and surface a area of 45–55 m²/g. The results of magnetic measurements, before and after aging at 60° at 93% relative humidity for 1 and 3 weeks, as described above, are presented in Table 2. In this series, two separate magnetic media were prepared from the passivating reaction product of Example 4 and compared with a control formulation which was prepared with an untreated PFERROMET 1500 pigment.

TABLE 2

Retention of Remanent Flux with PFERROMET 1500 Iron Pigment

| Passivating Composition | $B_r$ (Gauss) Initial | $B_r$ (Gauss) After Aging 1 Week | $B_r$ (Gauss) After Aging 4 Weeks | Retention of $B_r$ (%) 1 Week | Retention of $B_r$ (%) 4 Weeks |
|---|---|---|---|---|---|
| Example 4 | 893 | 861 | 788 | 96 | 88 |
| Example 4 (repeat) | 1520 | 1398 | — | 92 | — |
| Control (No Treatment) | 1262 | 1112 | 1026 | 88 | 81 |

It is again seen that the magnetic media based on the compositions of the present invention resulted in greater retention of remanence flux than the medium containing untreated pigment (i.e., Control).

That which is claimed is:

1. A process for producing a magnetic recording medium comprising:
   (i) treating magnetic metal particles with a passivating reaction product to form a treated pigment;
   (ii) mixing said treated pigment, a binder for said treated pigment and an inert organic solvent capable of dissolving said binder, to obtain a uniform dispersion thereof;

(iii) coating said dispersion onto a non-magnetic substrate;
(iv) orienting said treated pigment in a magnetic field; and
(v) removing said solvent from the coated substrate, said passivating reaction product comprising the reaction product of
(I) an organic halide having the formula

X—R″ wherein X is selected from the chlorine or bromine radical, and R″ is selected from alkyl radicals having 8 to 20 carbon atoms or the group

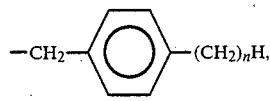

in which n is an integer between 8 and 22, inclusive, and a reactant selected from
(II) a silylalkyl ester of phosphorus having the formula

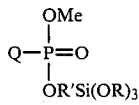

wherein Me denotes the methyl radical, Q is selected from —OMe or an alkyl group having from 1 to 4 carbon atoms, R′ is a divalent hydrocarbyl group having 3 to 8 carbon atoms, and R is an alkyl group having 1 to 3 carbon atoms, or a mixture of (III) an organic phosphate having the formula

and
(IV) an haloalkyl-functional silane having the formula

X—R′Si(OR)$_3$ wherein the symbols have their previously defined meanings.

2. The process according to claim 1, wherein X is chlorine.
3. The process according to claim 2, wherein R is the methyl radical.
4. The process according to claim 3, wherein Q is selected from the methoxy group or the methyl radical.
5. The process according to claim 4, wherein R′ is the trimethylene group.
6. The process according to claim 5, wherein R″ is the n-octadecyl radical.
7. The process according to claim 5, wherein R″ is the

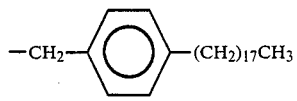

radical.
8. The process according to claim 1, wherein said magnetic metal particles are acicular iron particles.

* * * * *